United States Patent [19]
Nasuda

[11] Patent Number: 5,936,546
[45] Date of Patent: Aug. 10, 1999

[54] VARIABLE FORMAT RADIO PAGER HAVING POWER SAVING MODE DURING BINARY CODE TRANSMISSION

[75] Inventor: Takaaki Nasuda, Kakegawa, Japan

[73] Assignee: NEC Corporation, Tokyo, Japan

[21] Appl. No.: 08/879,625

[22] Filed: Jun. 20, 1997

[30] Foreign Application Priority Data

Jun. 20, 1996 [JP] Japan ................................. 8-160281

[51] Int. Cl.⁶ ..................................................... H04Q 9/00
[52] U.S. Cl. .................................. 340/825.44; 455/38.3; 455/343; 455/574; 370/311; 370/313
[58] Field of Search ...................... 340/825.44; 455/38.3, 455/343, 574; 370/311, 313

[56] References Cited

U.S. PATENT DOCUMENTS 5,493,282  2/1996  Petreye et al. ...................... 340/825.44

FOREIGN PATENT DOCUMENTS 3-123136  5/1991  Japan .
6-78008   3/1994  Japan .
8-56376   2/1996  Japan .

*Primary Examiner*—Brian Zimmerman
*Assistant Examiner*—Yves Dalencourt
*Attorney, Agent, or Firm*—Scully, Scott, Murphy & Presser

[57] ABSTRACT

A radio pager includes a waveshaper for shaping a baseband signal recovered from a demodulated variable format paging signal into a binary signal. A/D conversion and symbol decision circuitry provides conversion of the baseband signal into a multi-bit signal representing one of predefined discrete levels. A format detector responds to the binary signal from the waveshaper for producing a first output indicating that a two-level signal is forthcoming or a second output indicating that a more-than-two-level signal is forthcoming. The binary signal is supplied to a decoder in response to the first output of the format detector, and the multi-bit signal is supplied to the decoder in response to the second output of the detector. A power saving circuit is responsive to the first output of the format detector for inactivating the A/D conversion and symbol decision circuitry and responsive to the second output for activating that circuitry.

4 Claims, 1 Drawing Sheet

VARIABLE FORMAT RADIO PAGER HAVING POWER SAVING MODE DURING BINARY CODE TRANSMISSION

BACKGROUND OF THE INVENTION

1. Field of the Invention

The present invention relates generally to radio pagers, and more particularly to a power saving radio pager adapted to receive paging signals of variable coding format.

2. Description of the Related Art

A paging system, known as the FLEX system, provides variable format transmissions in which either binary-coded or quaternary-coded signals of variable rate are encapsulated in the payload field of a frame. Pagers of this system include A/D conversion and symbol decision circuitry necessary for detecting a quaternary-coded signal and waveshaping circuitry for detecting a binary-coded signal. The latter is used as an input of a synchronizer to provide a symbol timing pulse to the A/D conversion and symbol decision circuitry. The detected quaternary- or binary-coded signal is then entered to a decoder. The output of the decoder is then searched for a match with the user's address for alerting the user.

Since the output of the A/D conversion and symbol decision circuitry is useless when the signal in the payload field is a binary-coded signal, a need exists for saving power during such times.

SUMMARY OF THE INVENTION

It is therefore an object of the present invention to provide power savings for radio pagers that receive variable format signals in which either a binary-coded or quaternary-coded signal is encapsulated in their payload field in order to extend the life span of their battery.

According to a first aspect of the present invention, there is provided a radio pager comprising a radio frequency section for receiving a paging signal, a demodulator for recovering a baseband signal from the paging signal, and a waveshaping circuit for waveshaping the baseband signal to produce a binary signal. A converter circuit is provided for converting the baseband signal into a multi-bit signal representing one of a plurality of discrete levels. A format detector is responsive to the binary signal from the waveshaping circuit for producing a first output indicating that a two-level signal is forthcoming or a second output indicating that a more-than-two-level signal is forthcoming. The binary signal is supplied to a utilization circuit in response to the first output of the format detector, and the multi-bit signal is supplied to the utilization circuit in response to the second output of the format detector. Power saving circuitry is responsive to the first output of the format detector for inactivating the converter circuit, and responsive to the second output of the format detector for activating the converter circuit.

According to a second aspect, the present invention provides a power saving method which comprises the steps of receiving a radio paging signal, recovering a baseband signal from the received radio paging signal, waveshaping the baseband signal to produce a binary signal, and determining from the binary signal whether a two-level signal is forthcoming or a second output indicating that a more-than-two-level signal is forthcoming. If it is determined that the two-level signal is forthcoming, the receiving, recovering and waveshaping steps are repeated in a low power mode to produce a binary signal and this binary signal is decoded. If it is determined that the more-than-two-level signal is forthcoming, the receiving and recovering steps are repeated to recover a baseband signal and the baseband signal is converted in a high power mode to a multi-bit signal representing one of a plurality of discrete levels, and the multi-bit signal is decoded.

BRIEF DESCRIPTION OF THE DRAWINGS

The present invention will be described in further detail with reference to the accompanying drawings, in which.

DETAILED DESCRIPTION

Figure 1:
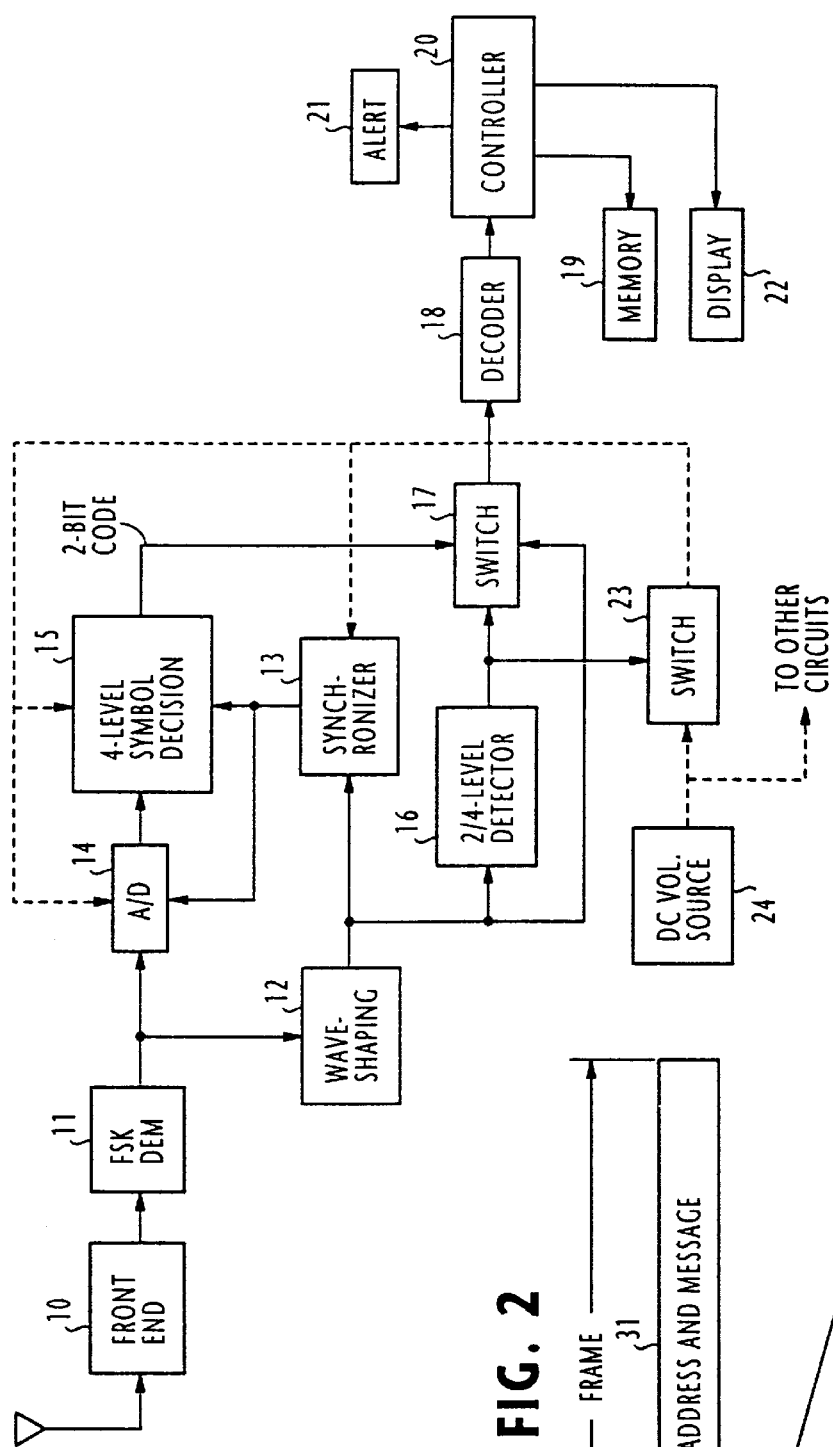
FIG. 1 is a block diagram of a selective calling radio pager of the present invention.

In a selective calling radio pager according to the present invention, shown in FIG. 1, a transmitted frequency shift keyed (FSK) radio paging signal is received by a radio frequency section, or front end 10 and the baseband of the signal is recovered by an FSK demodulator 11. The output of demodulator 11 is compared with a decision threshold in a waveshaping circuit 12 and converted to a pulse signal having sharply defined voltage levels. The output of waveshaping circuit 12 is used by a synchronizer 13 to extract clock information and produce a symbol timing pulse by synchronizing the receiver's symbol timing to the transmitter's timing.

Figure 2:
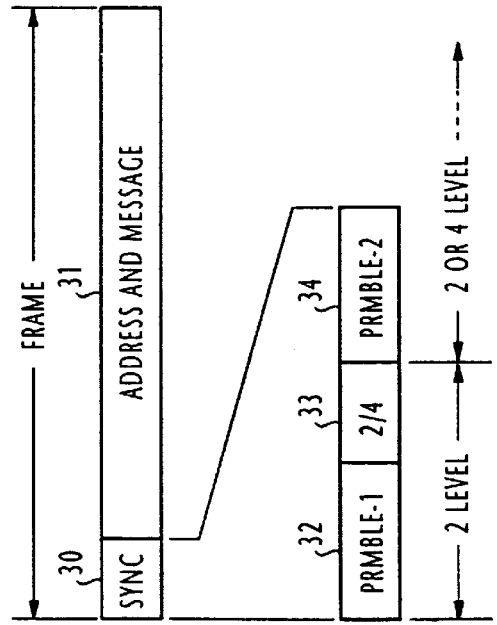
FIG. 2 shows a data format of a radio paging signal used in the present invention.

As illustrated in FIG. 2, the paging signal is a sequence of frames each of which has a sync field 30 and an address-and-message (payload) field 31. The paging signal is transmitted in a variable coding format by encapsulating either a two-level signal or a four-level signal in the payload field 31 of a frame. The sync field 30 includes subfields 32, 33 and 34 that appear in succession. The subfield 32 contains a preamble-1 of the binary format for indicating the starting point of the sync field 30, and the subfield 33 contains a 2/4 level identification bit to indicate whether a subsequent bit stream is a two-level or a four-level signal. The subfield 34 includes a preamble-2 of either the two- or four-level format for indicating he starting point of the payload field 31.

The output of FSK demodulator 11 is also applied to an analog-to-digital converter 14 where it is sampled in response to the symbol timing pulse and the sampled analog value is analyzed and converted to a corresponding digital value representing one of discrete levels into which the analog value of the received signal can be resolved. This A/D conversion is necessary when a four-level signal is transmitted since the demodulator 11 is not guaranteed to produce an output signal that precisely represents one of predefined discrete levels. A four-level symbol decision circuit 15 is provided for making a decision on the output of A/D converter 14 using the symbol timing pulse as boundaries of the transmitted four-level signal and producing a 2-bit coded signal.

A 2/4-level format detector 16 is connected to the output of the waveshaping circuit 12. Format detector 16 scans the input bit stream and locates the subfield 33 following the preamble-1 and examines the 2/4 identification bit to produce an output signal indicating whether the information that follows is a two-level or a four-level signal.

The outputs of waveshaping circuit 12 and symbol decision circuit 15 are supplied to a switch 17 where one of these is selected in accordance with the voltage level of the output of 2/4-level format detector 16. When the latter determines that the information contained in the payload field 31 is a two-level signal, the output of waveshaping circuit 12 is selected and applied to a decoder 18. When it determines that the information in that field is a four-level signal, the output of symbol decision circuit 15 is applied to the decoder 18.

Decoder 18 decodes the information in the payload field 31 and feeds a controller 20 where the decoded information is checked against an address code stored in a memory 19 such as PROM. If the stored address matches a transmitted address, the controller 20 notifies the user of the arrival of a call using an alerting device 21. A liquid crystal display 22 is connected to the controller 20 to provide a display of a transmitted message.

In order to provide power saving operation of synchronizer 13, A/D converter 14 and symbol decision circuit 15, the output of the 2/4-level format detector 16 is coupled to a power switch 23. When the pager is in a standby state, these circuits are in an inactive state. When the 2/4-level detector 16 determines that a two-level signal is forthcoming, switch 23 remains open to maintain these circuits in the inactive state. When the 2/4-level detector 16 determines that a four-level signal is forthcoming, power switch 23 is closed and a DC voltage from a voltage source 24 is supplied through it to synchronizer 13, A/D converter 14 and symbol decision circuit 15 to activate these circuits. The DC voltage of source 24 is also supplied directly to the circuits other than synchronizer 13, A/D converter 14 and decision circuit 15.

Therefore, if the information of payload field 31 is a binary-coded signal, the output of waveshaping circuit 12 is directly used as an input of decoder 18 and the power supply to synchronizer 13, A/D converter 14 and symbol decision circuit 15 is turned off. If the information of payload field 31 is a quaternary-coded signal, the power supply to synchronizer 13, A/D converter 14 and symbol decision circuit 15 is turned on and the output of symbol decision circuit 15 is used as an input of decoder 18.

What is claimed is:

1. A radio pager comprising:

a radio frequency section for receiving a paging signal;

a demodulator for recovering a baseband signal from the paging signal;

a waveshaping circuit for waveshaping the baseband signal to produce a binary signal;

converter means for converting the baseband signal into a multi-bit signal representing one of a plurality of discrete levels;

a format detector responsive to said binary signal from said waveshaping circuit for producing a first output indicating that a two-level signal is forthcoming or a second output indicating that a more-than-two-level signal is forthcoming;

a switch for supplying said binary signal to a utilization circuit in response to the first output of the format detector or supplying the multi-bit signal of the converter means to said utilization circuit in response to the second output of the format detector; and power saving circuitry responsive to the first output of the format detector for inactivating said converter means, and responsive to the second output of the format detector for activating said converter means.

2. A radio pager as claimed in claim 1, wherein said converter means comprises:

a synchronizer for producing a timing signal from the shaped baseband signal;

an analog-to-digital converter for converting the baseband signal to a digital signal using said timing signal; and a symbol decision circuit for producing said multi-bit signal from said digital signal using said timing signal.

3. A power saving method comprising the steps of:

a) receiving a radio paging signal;

b) recovering a baseband signal from the received radio paging signal;

c) waveshaping the baseband signal to produce a binary signal;

d) determining from the binary signal whether a two-level signal is forthcoming or a more-than-two-level signal is forthcoming;

e) if it is determined that the two-level signal is forthcoming, repeating the steps (a) to (c) in a low power mode to produce a binary signal and decoding the binary signal; and f) if it is determined that the more-than-two-level signal is forthcoming, repeating the steps (a) and (b) to recover a baseband signal and converting the baseband signal, in a high power mode, to a multi-bit signal representing one of a plurality of discrete levels, and decoding the multi-bit signal.

4. The method of claim 3, wherein the step (f) comprises:

waveshaping the baseband signal to produce a binary signal;

producing a timing signal from the binary signal;

converting the baseband signal to a digital signal using said timing signal; and producing said multi-bit signal from said digital signal using said timing signal.

* * * * *